United States Patent [19]

Chrisco

[11] Patent Number: 5,467,735
[45] Date of Patent: Nov. 21, 1995

[54] AUTOMATIC PET FEEDER

[75] Inventor: Larry L. Chrisco, Fairland, Okla.

[73] Assignee: Blitz U.S.A., Inc., Miami, Okla.

[21] Appl. No.: 257,013

[22] Filed: Jun. 8, 1994

[51] Int. Cl.⁶ .................................................. A01K 5/02
[52] U.S. Cl. ........................... 119/51.5; 119/53; 119/52.4
[58] Field of Search .................................. 119/51.5, 52.4,
119/53, 74, 77, 61, 51.12; 220/651, 653,
505, 503, 501

[56] References Cited

U.S. PATENT DOCUMENTS

| | | | |
|---|---|---|---|
| 1,288,061 | 12/1918 | Leighton | 220/653 |
| 2,407,455 | 9/1946 | Shakesby et al. | 220/653 |
| 2,749,881 | 6/1956 | Gustafson | 119/52.4 |
| 2,836,150 | 5/1958 | Robinson | 119/53 |
| 3,076,435 | 2/1963 | Seymour | 119/77 |
| 3,730,141 | 5/1973 | Manning et al. | 119/51.5 |
| 3,951,107 | 4/1976 | Doty | 119/52.4 |
| 4,192,256 | 3/1980 | Clugston | 119/51.5 |
| 4,303,039 | 12/1981 | Thibault | 119/53 |
| 4,947,796 | 8/1990 | Robinette | 119/51.5 |
| 5,241,835 | 9/1993 | Ascone | 220/501 |

FOREIGN PATENT DOCUMENTS

| | | | |
|---|---|---|---|
| 2363281 | 5/1978 | France | 119/51.5 |
| 8401729 | 12/1985 | Netherlands | 119/51.5 |

*Primary Examiner*—Todd E. Manahan
*Attorney, Agent, or Firm*—Hovey, Williams, Timmons & Collins

[57] ABSTRACT

A pet feeding and watering assembly (20) includes a pet feeder (22) and a pet waterer (24), where the feeder (22) may be detachably retained within a cavity (40) of the waterer (24). The feeder (22) has a molded body (26) having marginal wall structure (42–52) defining an interior chamber (54) communicating a feed inlet opening (98) and a feed outlet opening (72) across a shiftable divider barrier (136). Feed inlet lid (28) and feed outlet lid (30) are interchangeable. The pet waterer (24) includes reservoir-defining wall structure (36), a food or feeder-receiving cavity (40), and partition supports (166–172) for resisting the compressive loading of lower cavity wall (196).

11 Claims, 6 Drawing Sheets

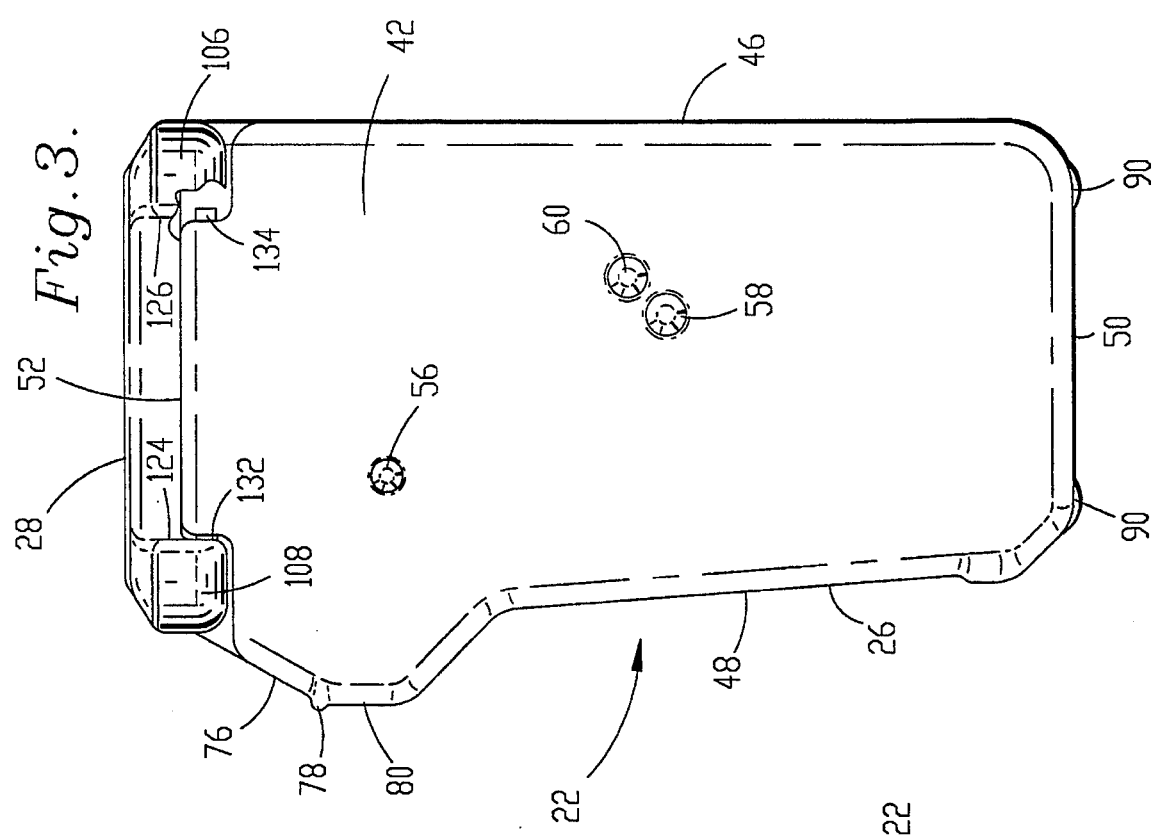
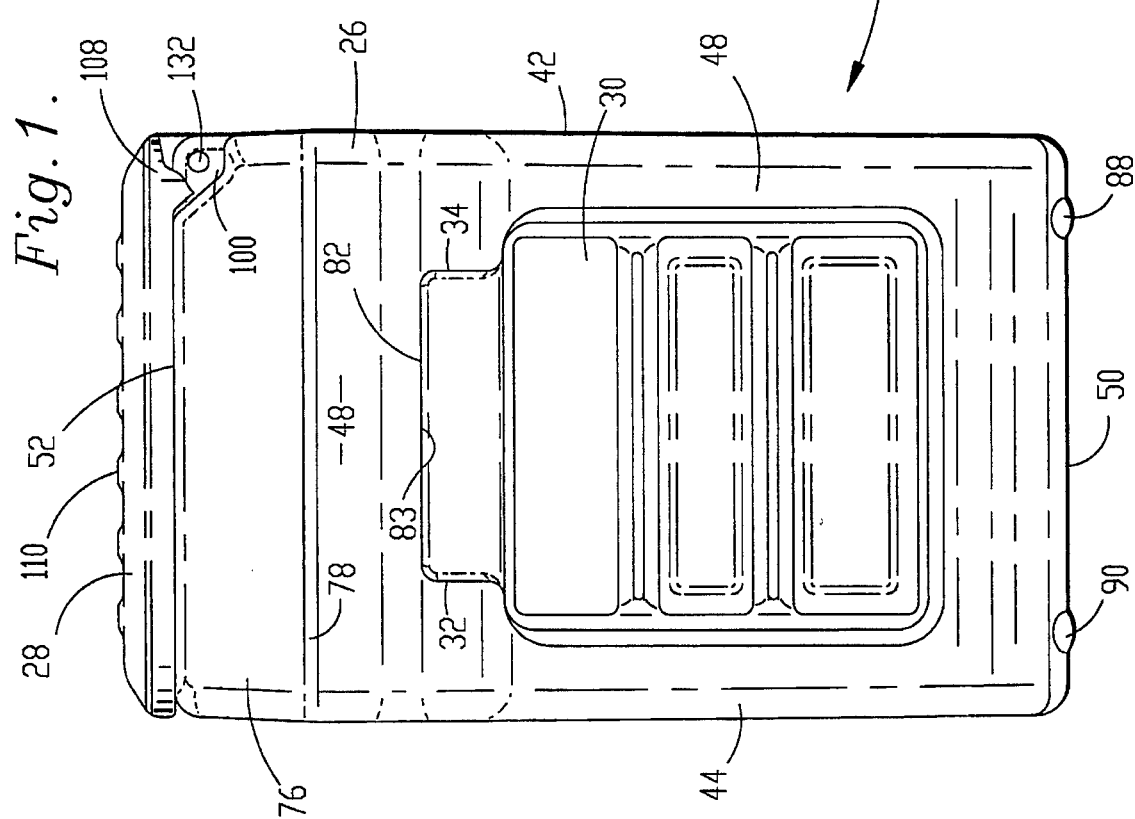

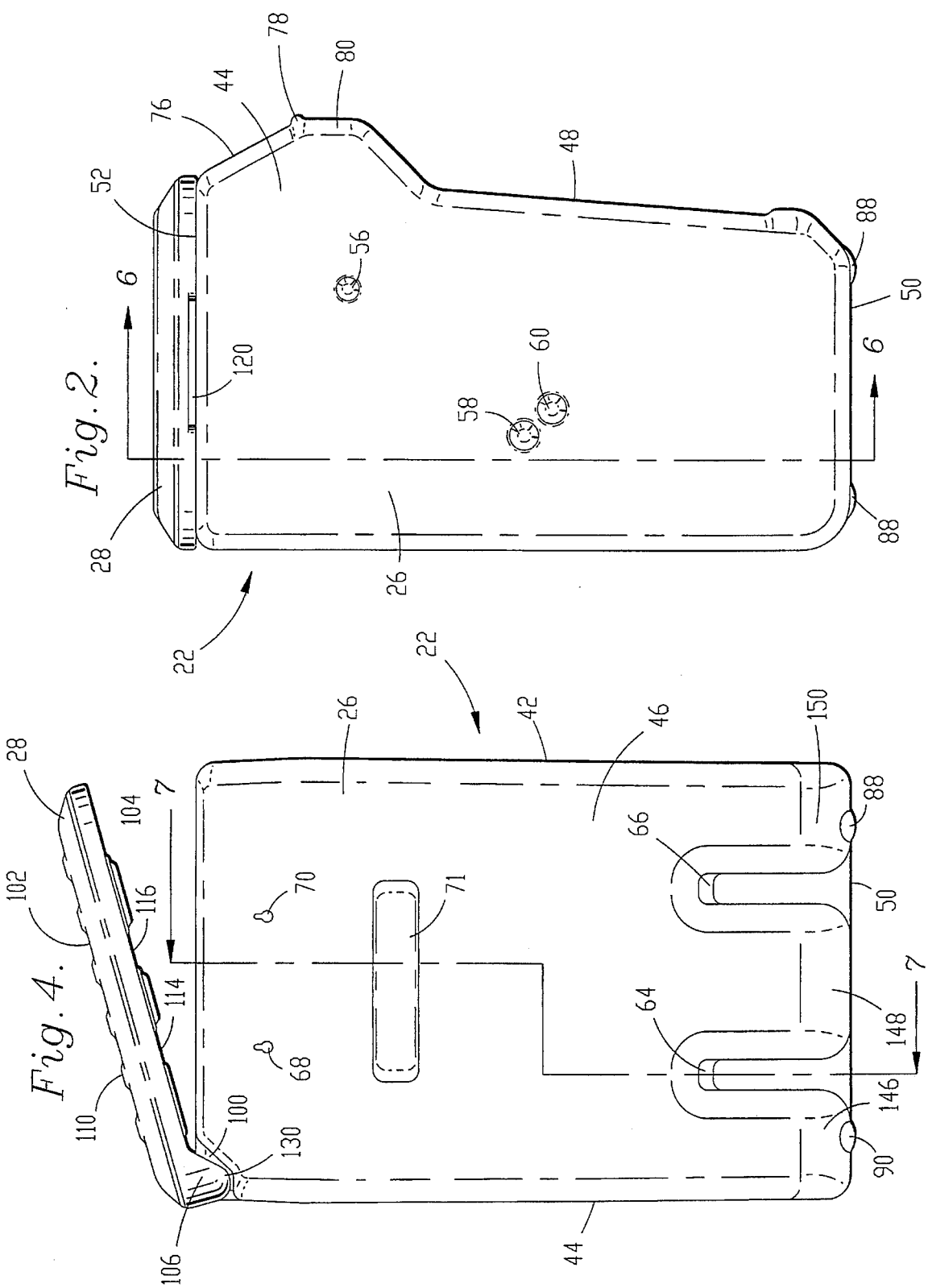

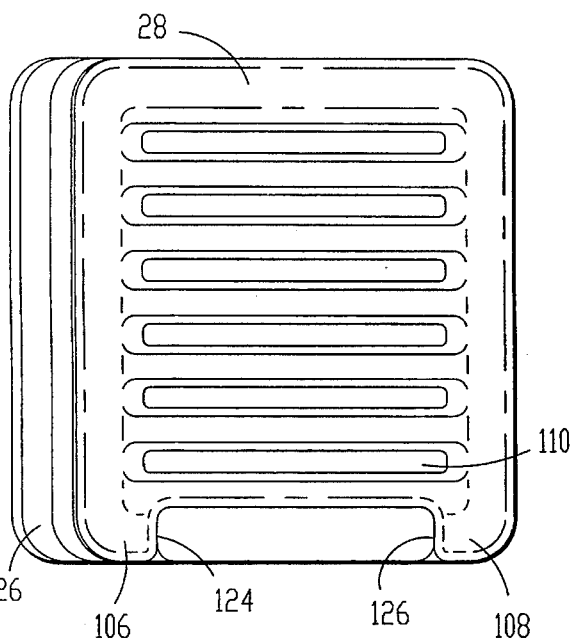
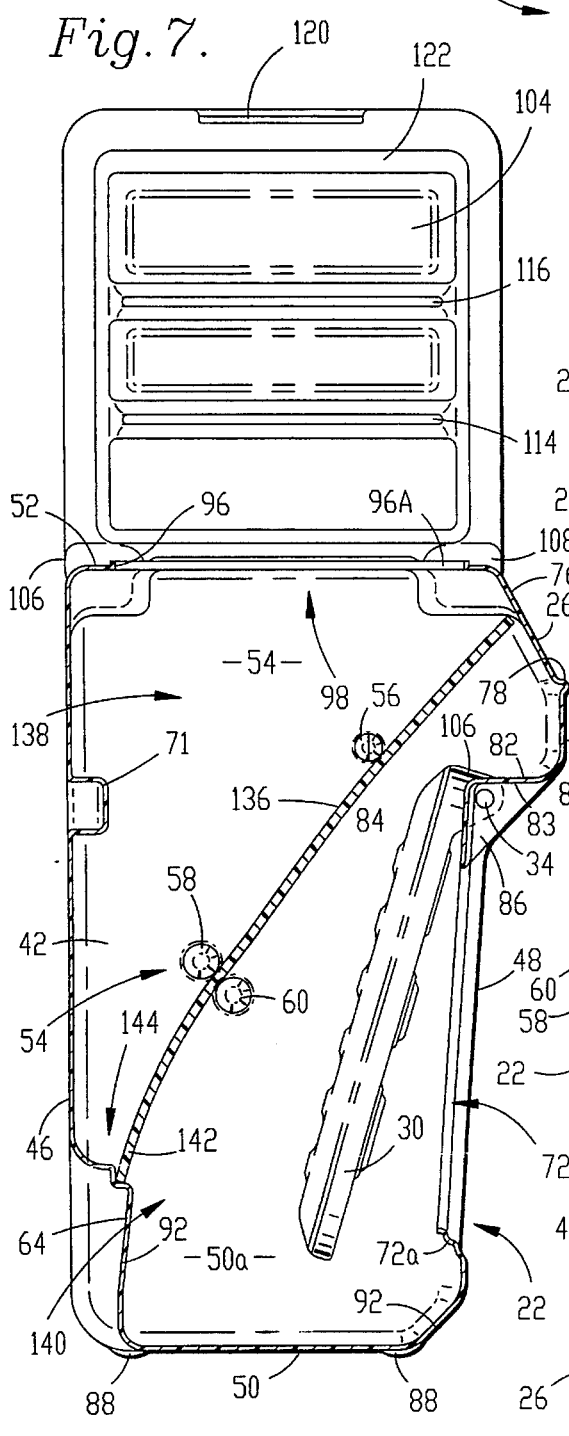
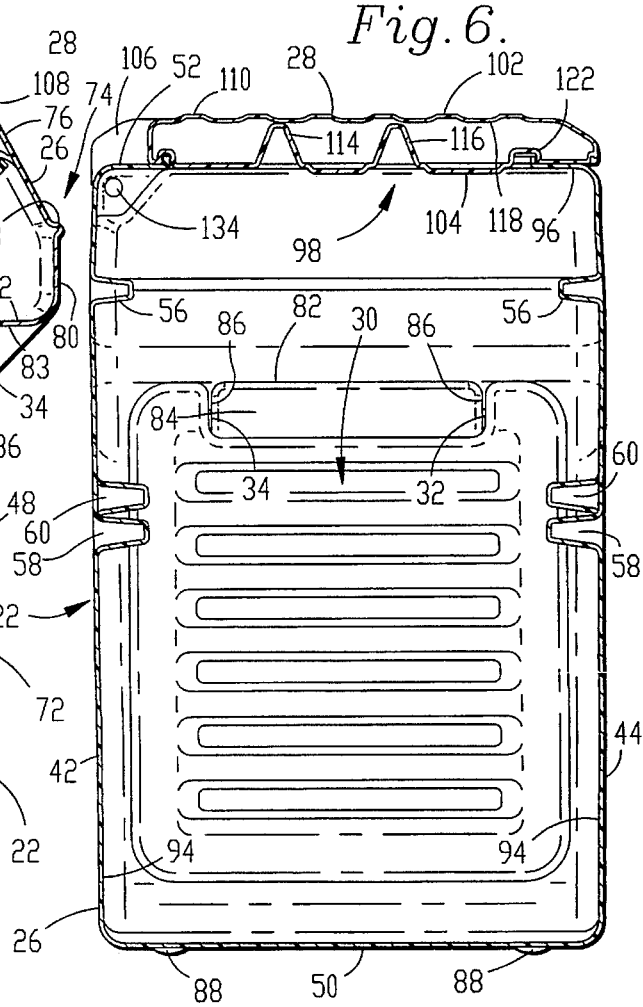

AUTOMATIC PET FEEDER

BACKGROUND OF THE INVENTION

1. Field of the Invention

The invention pertains to the field of devices for feeding and watering animals. More specifically, the invention involves a combination pet feeder and pet waterer assembly for victualing a pet over an extended period of time by supplying sub-portions of food and water from separate food and water reservoirs. The assembly includes automatic pet feeder components for distributing dried food, for protecting the food from moisture damage, and presenting sub-quantities of the food to a pet for consumption. Additionally, a pet watering dish contains a volume of water, which is shielded from contamination, and disburses the water in sub-volumes over time. The pet feeder and pet watering dish may be detachably connected as a single unit that resists overturning and conserves space.

2. Description of the Prior Art

A variety of pet watering and feeding dishes are commercially available; however, these devices typically lack the capacity for providing both food and water to a pet over an extended period of time. U.S. Pat. No. 4,192,256 to Clugston describes a unitary pet dish that serves as both a pet food and watering station. This dish includes a central water reservoir for supplying water to a drinking cup through an aperture. The interior reservoir contains a partition serving to dampen vibration-induced movement of water within the reservoir. The top of this dish includes a food-receiving cavity from which the pet may consume individual meals, but there is no mechanism for providing numerous successive meals in the absence of a consistent interactive human source of supply. Furthermore, in the event that this food receiving cavity is subjected to heavy compressional loading forces, the entire dish would tend to deform. From an external perspective, U.S. Pat. No. Des 254,454 depicts a device having an ornamental design similar to that shown in U.S. Pat. No. 4,192,256.

Pet feeding devices for distributing a supply of dried food are also known, but these commonly fail to provision a pet with water (as needed in addition to the food) and, further, numerous specific problems are associated with manufacturing and utilizing these feeders. These feeders typically have a main food reservoir from which portions of food are dispensed to a feeding trough for consumption. Food is poured into these feeders through a top inlet opening and a pet may eat by accessing the feeding trough from a side outlet opening. The respective top and side openings are commonly covered by very different lids that are not interchangeable.

The practice of designing feeders having noninterchangeable lids increases manufacturing expense and complexity by requiring additional tooling and by introducing operational difficulties in assembly. The feed inlet and outlet lids typically have substantially different constructions due to the differences in their functionality; i.e., the top food reservoir lid pivots outwardly away from its corresponding opening to allow the addition of food to the reservoir, while the feed trough lid is generally lighter and pivoted inwardly as the pet accesses the feeding trough. Accordingly, conventional designs have utilized different lids and lid mounting means at the respective openings. Furthermore, conventional designs may require the bolting or riveting of certain components, which also increases the cost of manufacture.

In use, prior feeding devices must typically be bolted or screwed to a wall or other structure, in order to prevent overturning of the devices by the pet, particularly if the pet is a large one. This necessity of bolting the feeders denies subsequent mobility, and converts the feeders into semipermanent fixtures which may ultimately become an eyesore or other similar nuisance.

SUMMARY OF THE INVENTION

The invention overcomes the problems that are outlined above by providing a combination pet waterer and feeder assembly which is easily and economically assembled from a minimal number of different parts. Furthermore, the structure is portable but difficult to overturn, and does not require the use of anchor screws. The assembly is also extremely versatile, inasmuch as it may be disassembled into separate feeder and waterer units for divided use, as needed.

The combination pet feeder and waterer assembly of the invention may be divided into two separable components including a pet feeder assembly for retaining and protecting a quantity of food for gradual distribution, and a pet watering device for protecting a quantity of water for gradual distribution. The feeder and waterer are detachably coupled together, and may be used as separate components.

In a preferred embodiment of the invention, the automatic feeder assembly includes a body having marginal wall structure defining a chamber communicating a food inlet opening and a food outlet opening. A pair of interchangeable, pivotally mounted lids cover the respective inlet and outlet openings. The lids each have indentations allowing them to snap onto a corresponding mounting structure such as a boss rising from the marginal wall proximal to one of the openings.

Another preferred embodiment of the invention includes a pet watering unit having container walls defining an interior reservoir for retaining water, a water supply aperture communicating the reservoir with a drinking trough, and a central food-receiving cavity. The cavity includes a bottom cavity wall supported by an underlying partition to resist against deformation of the cavity in the event that heavy compressional forces are applied to the bottom cavity wall. Most preferably, the pet feeder assembly is detachably retained within the food-receiving cavity.

BRIEF DESCRIPTION OF THE DRAWINGS

FIG. 1 is a front elevational view of a pet feeder component of the invention, depicting a side feed outlet lid and an uppermost feed inlet opening lid, and having a partially removed section depicting a boss for mounting the inlet opening lid;

FIG. 2 is a left side elevational view thereof depicting exterior recesses forming corresponding interior protrusions for receiving a shiftable interior dividing barrier;

FIG. 3 is a right side elevational view thereof depicting exterior recesses forming corresponding interior protrusions for receiving the shiftable interior dividing barrier;

FIG. 4 is a rear elevational view thereof depicting the feed inlet opening lid pivoted outwardly away from its closed position, a recessed handle, and a pair of abutment members providing an interior feed chute for transferring food from an interior feed inlet opening to an interior feed outlet trough;

FIG. 5 is a top plan view thereof depicting the feed inlet opening lid in a closed position;

FIG. 6 is a sectional interior view taken along line 6—6 of FIG. 2;

FIG. 7 is an interior sectional view taken along line 7—7 of FIG. 4, depicting the feed inlet and feed outlet lids in open positions, and depicting the interior dividing barrier separating the interior chamber into respective feed inlet and feed outlet sides;

DETAILED DESCRIPTION OF THE PREFERRED EMBODIMENT

Figure 8:
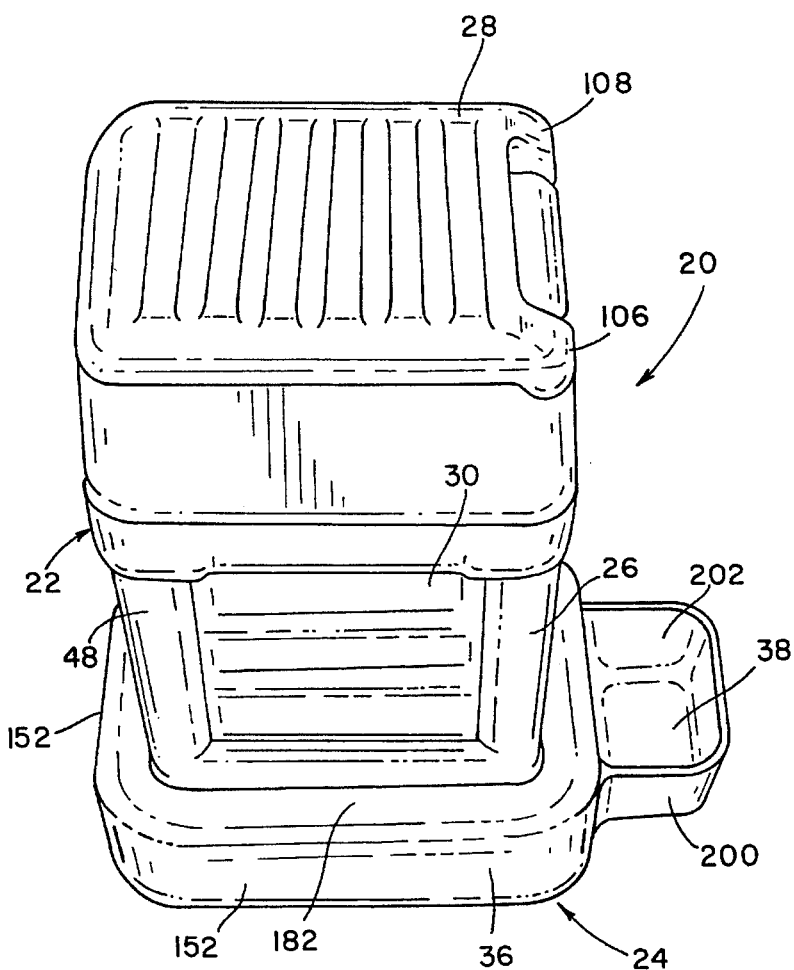
FIG. 8 is a front, top, perspective view of the pet feeder detachably received within a food-receiving cavity of a pet watering dish component of the invention.
Figure 15:
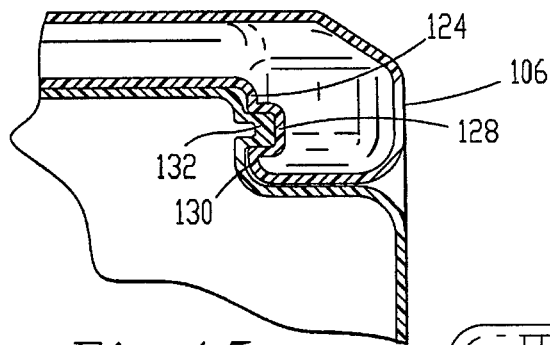
FIG. 15 is an enlarged, fragmentary sectional view showing details of the hinge means for the feed inlet lid.

As is best depicted in FIG. 8, pet feeding and watering assembly 20 includes automatic pet feeder 22 detachably received within a corresponding pet waterer 24. Assembly 20 is preferably formed of a resilient injection molded synthetic resin. Feeder 22 includes molded body 26, feed inlet lid 28, feed outlet cover or lid 30, and corresponding lid mounting bosses 32 and 34. Pet waterer includes reservoir-defining wall structure 36, drinking trough 38, and a central food or feeder-receiving cavity 40.

FIG. 7 depicts pet feeder 22 having marginal wall structure including opposed side walls 42 and 44, rear wall 46, front wall 48, bottom wall 50 and top wall 52, which cooperate to surround interior chamber 54. Side wall 42 includes inwardly extending raised protrusions 56, 58 and 60. Side wall 44 includes inwardly raised protrusions that are identical to protrusions 56, 58 and 60, but horizontally opposed thereto.

FIG. 4 depicts rear wall 46, which includes a pair of vertically elongated, inwardly raised (outwardly recessed from the FIG. 4 perspective) abutment members 64 and 66. Rear wall 46 also includes key-slotted anchor holes 68 and 70, as well as rectangular handle recess 71.

Front wall 48 includes a rectangular food outlet opening 72 having an inwardly extending lip 72a surrounding its perimeter. A nose portion 74 presents an outwardly and downwardly sloping segment 76 connecting top wall 52 with a forward horizontal reinforcing ridge 78. Vertical segment 80 connects ridge 78 to a boss 82, which is opposed to handle recess 71. Boss 82 has a horizontal handle or lifting surface 83, which terminates in a normal orientation with respect to surface 84. Surfaces 83 and 84 are bounded on opposed sides by triangular walls 86.

Bottom wall 50 has a rectangular dimension, with the greater dimension running between side wall 42 and side wall 44. The bottom exterior portion of wall 50 has four support buttons, e.g., buttons 88 and 90 proximal to the respective corners of wall 50. The interior or chamber 54 side of wall 50 presents a feeding trough area 50a defined by walls 92 and 94.

Top wall 52 has an inwardly extending rim 96 including a raised perimeter 96a completely surrounding food inlet opening 98. The portion of top wall 52 proximal to side wall 42 includes triangular bosses 100.

Feed inlet lid 28 and feed outlet lid 30 are constructed identically. By way of example, each lid includes a first panel 102, a second panel 104, and a pair of opposed boss-engaging ears 106 and 108 (see FIGS. 6 and 7). Panel 102 has a plurality of spaced, substantially rectangular, outwardly raised reinforcing ridges 110. Panel 104 has a pair of elongated, parallel, recessed, triangular wedge supports 114 and 116 closing to meet an interior side 118 of panel 102. Panel 104 also has a recessed handle portion 120, and a rectangular channel portion 122. Channel 122 has dimensions sufficient for receiving either rim perimeter 96a or lip 72a. Ears 106 and 108 have respective faces 124 and 126 each including a cylindrical depression 128, in a shoulder 130 extending beyond the plane of panel 104 remote from panel 102.

Lid mounting bosses 32 and 34 are integrally formed with first boss 82 and second boss 100, and each include a pair of opposed cylindrical nibs, e.g., opposed nibs 132 and 134 (see FIG. 3). Nibs 132 and 134 have dimensions corresponding to the dimensions of depression 128 for snap-locking interengagement therewith to form a pivot axis along a line of symmetry extending through the cylindrical axis of nibs 132 and 133. Accordingly, lid 28 may pivot upwardly about mounting bosses 132 and 134 away from opening 98 to expose interior chamber 54. Similarly, lid 30 may pivot upon bosses 32 and 34 towards interior chamber 54.

Dividing barrier 136 (see FIG. 7) is received between opposed protrusions 56, 58 and 60 as illustrated and extends completely across chamber 54 from wall 42 to wall 44. Barrier 136 separates chamber 54 into a food inlet side 138 and food outlet side 140. A bottom portion 142 of barrier 136 contacts the forward interior surfaces of abutment members 64 and 66 to form a tripartite chute 144, with one portion of the chute corresponding to each of the three sections (sections 146, 148, and 150) that are separated by abutments 64 and 66 as depicted in FIG. 4. Accordingly, divider 136 may be selectively shifted along the diagonal lines defined by opposed protrusions 56, 58 and 60 to increase or decrease an amount of exposed area beneath the wall across from chute 144. Chute 144 communicates inlet side 138 and outlet side 140 across this variable area.

Figure 9:
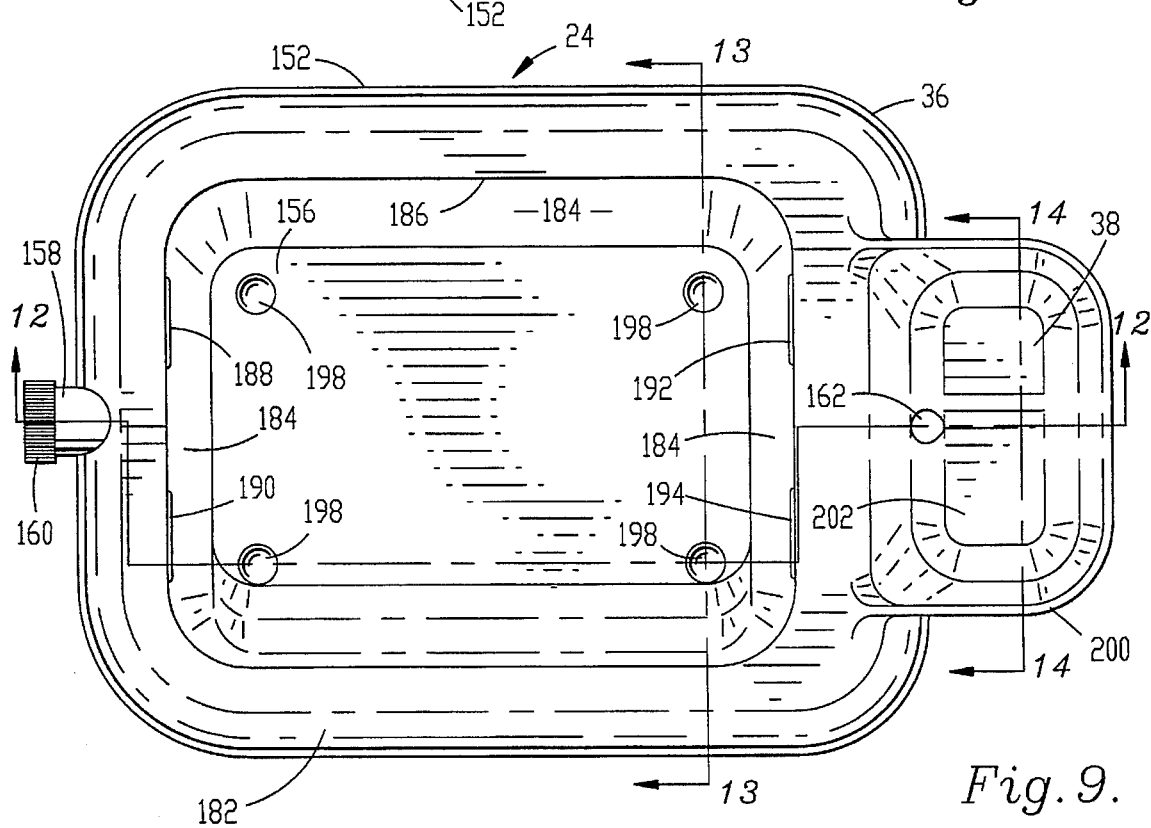
FIG. 9 is a top plan view of the pet watering dish, depicting a water inlet opening, a water outlet aperture, the pet feeder receiving cavity, and a drinking trough.
Figure 13:
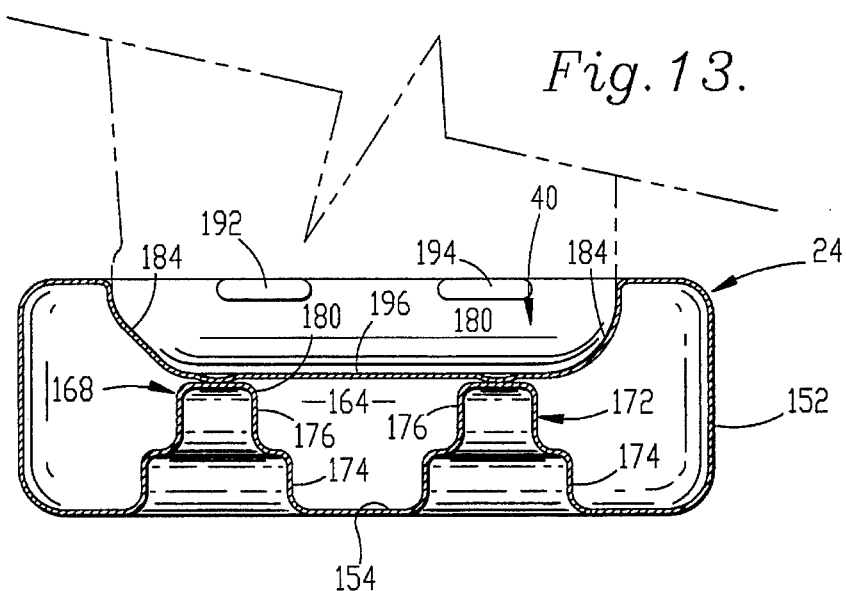
FIG. 13 is a sectional view taken along line 13—13 of FIG. 9.

FIG. 9 depicts a preferred pet waterer 24 having integrally formed reservoir wall structure 36, drinking trough 38, and a central food-receiving cavity 40.

Figure 12:
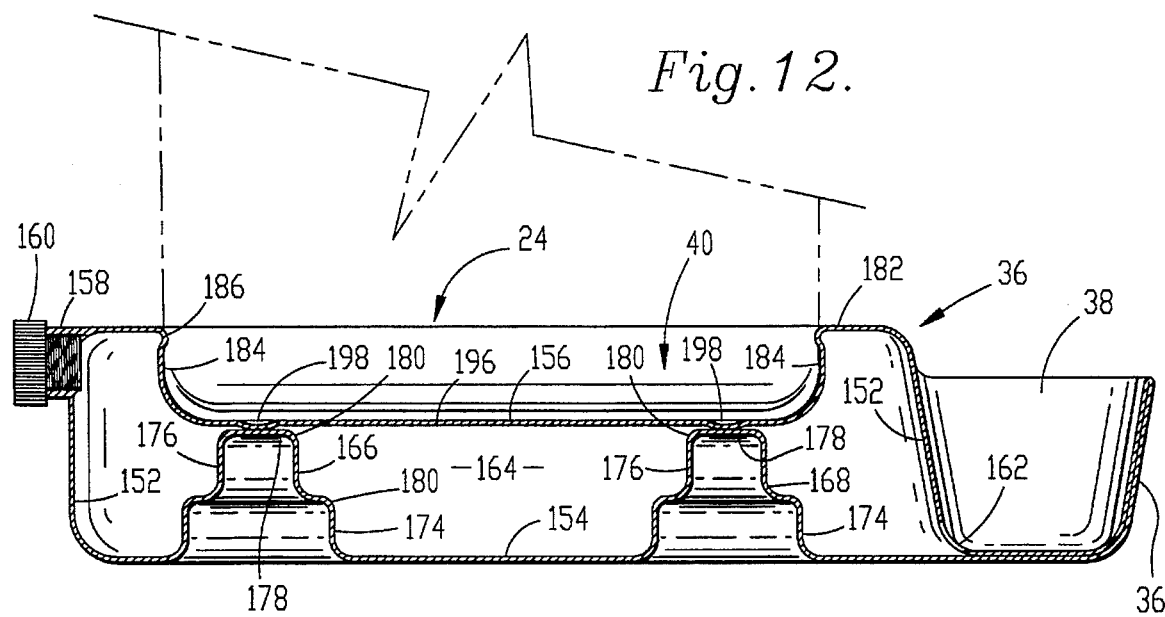
FIG. 12 is a sectional view taken along line 12—12 of FIG. 9.
Figure 11:
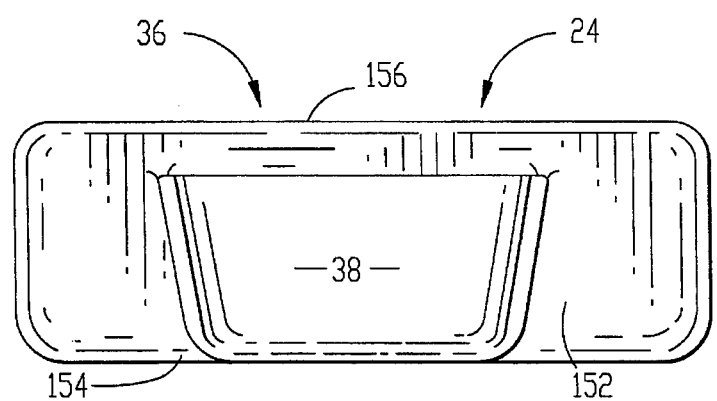
FIG. 11 is a front elevational view of the pet watering dish.

As is best depicted in FIG. 12, reservoir wall structure 36 includes a curved side reservoir wall 152 surrounding bottom reservoir wall 154 and top reservoir wall 156. Side reservoir wall 152 incorporates, at its highest elevation, a threaded water inlet opening 158 for receiving plug 160 or a standard garden hose. Wall 152 also has aperture 162 at its lowermost elevation communicating interior reservoir 164 with drinking trough 38.

Figure 10:
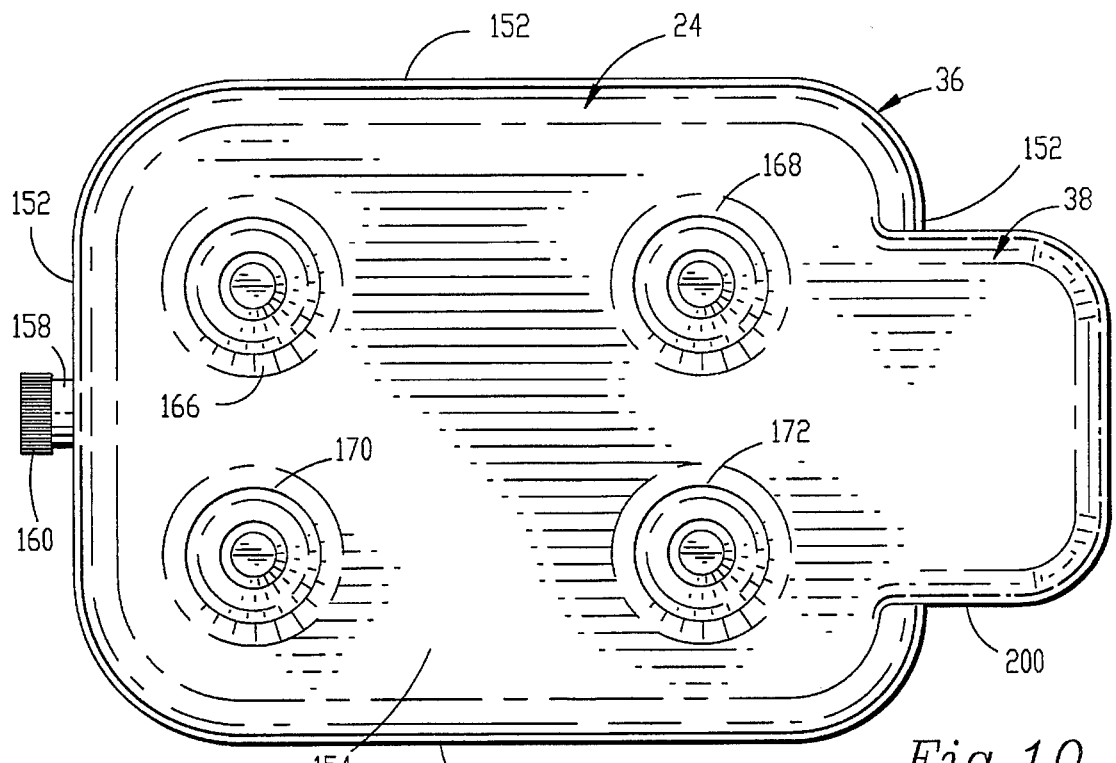
FIG. 10 is a bottom plan view thereof depicting four partitions providing interior support for the pet feeder receiving cavity.

FIGS. 10 and 12 depict bottom reservoir wall 154 having four identical partitions 166, 168, 170, and 172. By way of example, partition 166 protrudes inwardly towards reservoir 164, and is formed of a first cylindrical recessed portion 174 which is concentrically aligned with a smaller diameter cylindrical recessed portion 176. The uppermost segment of portion 176 terminates in a flat end cap 178 that abuts top reservoir wall 156. Additionally, partition 166 includes partition shoulder 180, which is useful, in combination with top reservoir wall 156, for damping vibration-induced movement of water within reservoir 164.

FIGS. 9 and 12 depict top reservoir wall 156 having an uppermost flat portion 182 surrounding an arcuate, descending side-margin 184 defining the perimeter of cavity 40. Margin 184 has an upper edge 186 surrounding its upper perimeter, and edge 186 has four feeder-engaging pads, 188, 190, 192, and 194. Lower cavity wall portion 196 includes four dimples, e.g., dimple 198, which serve to contact a corresponding reservoir partition, e.g., partition 166.

Figure 14:
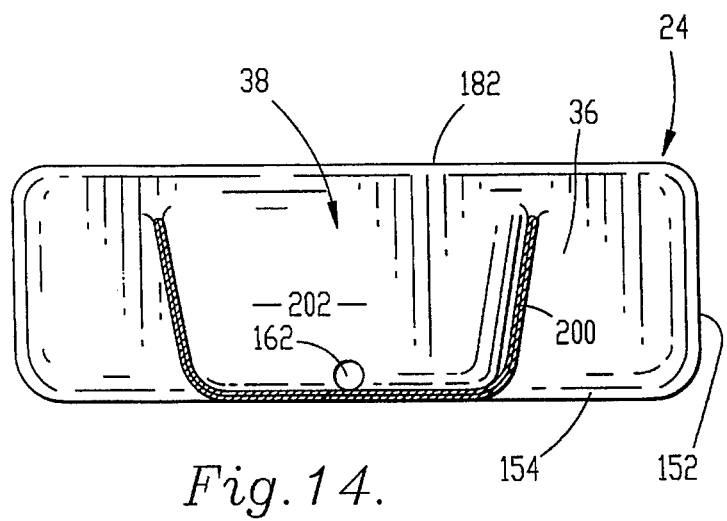
FIG. 14 is a sectional view taken along line 14—14 of FIG. 9.

FIGS. 9 and 14 depict drinking trough 38, which is integrally joined with reservoir wall structure 36. Drinking trough 38 has a shallow cup-like wall 200, which forms an interior water presentment area 202 for receiving and retaining water from aperture 162. Aperture 162 may optionally be closed with a plug for traveling purposes.

In operation, feeder component 22 may be placed with bottom wall 50 received within cavity 40, as depicted in FIG. 8. In this assembled configuration, feeder engaging pads 188–194 contact corresponding side walls 42 and 44 of feeder 22 for a close, frictional interfitting engagement. Additionally, by way of example, button 90 is received within dimple 198 to place outlet opening 72 in a position where it is not vertically aligned with drinking trough 38 to avoid the potential for the pet dropping food into the water.

Food inlet opening lid 28 may be pivoted outwardly away from food inlet opening 98 to expose food inlet side 138 of chamber 54. A quantity of dried dog food, or other animal feed, is poured into inlet side 138, passes through chute 144, and a sub-quantity arrives at feeding trough area 50a where is it presented to a pet for consumption. As the sub-quantity is consumed, additional food passes through chute 144 until the entire supply of food on inlet side 138 is exhausted. Respective lids 28 and 30 are normally closed to prevent the atmosphere, insects, and vermin from destroying or consuming the dried food. Barrier 136 may be shifted to vary the size of chute 144 responsive to conditions of use such as allowing differently sized kibbles to pass through chute 144.

A pet must open lid 30 by pressing inwardly against panel 104 prior to consuming food in trough area 50a. The deep wedges 114 and 116 allow, for example, a dog to push upon a given wedge with the dog's nose without slippage, thereby opening lid 30. Additionally, wedges 114 and 116 generally support panel 102 of lid 28, such that a grown man may find full support while sitting on panel 102.

Lids 28 and 30 are identical and entirely interchangeable, which means that feeder 22 may be produced cost-effectively because fewer different parts are required. Additionally, interchangeability is facilitated because the lids may be snapped on and off of their respective mounting bosses 32 and 34, as is permitted by flexion of the synthetic resin material forming ears 106 and 108 in addition to flexion bosses 32 and 34.

In the assembled configuration of the invention, pet waterer component 24 forms a heavy support base for feeder 22 that resists overturning of feeder 22 by virtue of the weight of water contained within reservoir 164 and the close fit between the bottom of feeder 22 and cavity 40. Additionally, waterer 24 has greater width and length dimensions than does bottom wall 50, and these dimensions provide further resistance against forces having the potential for overturning feeder 22. In the event that there remains a substantial risk of a pet overturning feeder 22, despite these advantages against overturning, feeder 22 may be anchored on a wall or other structure by providing screws for hanging feeder 22 from slots 68 and 70.

Pet waterer 24 may be filled by removing plug 160 from aperture 158, and flowing water into reservoir 164. This water will then flow through aperture 162 and into drinking trough 38 for consumption in small amounts, as a pet may require from time to time. Water presentment area 202 has a relatively small aerial extent as compared to that of the entire waterer 24. Accordingly, this reduced area allows for a greatly reduced degree of contamination from sources such as fallen leaves, drowned insects, or bird droppings.

When pet feeder 22 is fairly large and heavy such as, for example, one that may contain 50 pounds of dog food, the deformational forces exerted against cavity 40 are counterbalanced by virtue of support from partitions 166–172, which resist against compressive loading of lower cavity wall 196 and transfer this load to the ground. Additionally, in the case of these large and heavy feeders, handles 71 and 83 are raised a sufficient distance to assist the avoidance of back injury that might otherwise occur due to stooping as feeder 22 is lifted.

Partitions 168 and 172 also act as a baffle to reduce vibration-induced movement of liquid within reservoir 164. These vibration-induced movements may occur, for example, whenever pet waterer 24 is being transported in an automobile, and could cause surge pressures that would tend to loosen any plug received within aperture of 162 or, in the absence of such a plug, cause water to slosh out of trough 38.

I claim:

1. An automatic pet feeder having a minimal number of different parts for presenting a quantity of food to a pet for consumption over a period of time, said feeder comprising:

a body having marginal wall structure defining a chamber therein communicating a feed inlet opening and a feed outlet opening, said body having an inlet lid coupling means proximal to said inlet opening and an outlet lid coupling means proximal to said outlet opening;

a divider wall separating said chamber into a feed inlet side and a feed outlet side, and providing a chute communicating said feed inlet and outlet sides;

an inlet lid pivotally coupled with said inlet lid coupling means to cover said inlet opening at a primary position to deny access thereto, and not covering said inlet opening at a plurality of secondary positions pivoted away from said first position to allow access into said inlet side; and an outlet lid pivotally coupled with said outlet lid coupling means at a closed position covering said outlet side to deny access thereto and an open position pivoted away from said closed position to permit access to said outlet side, said inlet lid and said outlet lid having substantial similarity sufficient to allow operably interchanging said lids by substituting said inlet lid for said outlet lid on the outlet lid coupling means and substituting said outlet lid for said inlet lid on the inlet lid coupling means.

2. The feeder as set forth in claim 1, further including means for providing an amount of water to a pet in sub-amounts over time, for resisting against overturning of said feeder, and for detachably interengaging said feeder.

3. The feeder as set forth in claim 2, said providing means including a drinking trough in communication with a water reservoir, and a feeder-receiving cavity.

4. The feeder as set forth in claim 1, each of said inlet and outlet lids including an opposed pair of depressions for engaging the respective corresponding inlet and outlet coupling means.

5. The feeder as set forth in claim 4, said inlet lid coupling means including a raised boss having a pair of protrusions raised in opposite directions to interengage said depressions.

6. The feeder as set forth in claim 4, said inlet lid being identical to said outlet lid.

7. The feeder as set forth in claim 1, said body including means for shiftably retaining said divider wall at one of a plurality of selected positions to alter the dimensions of said chute.

8. The feeder as set forth in claim 7, said retaining means including opposed bosses protruding inwardly from said marginal wall structure to retain marginal zones presented by said divider wall.

9. A pet feeder for feeding a pet over a period of time comprising:

a pet feeder including a body, an inlet lid, and an outlet lid, said body including marginal wall structure defining a chamber within said body communicating a feed inlet opening and a feed outlet opening, a divider wall separating said chamber into a feed inlet side and a feed outlet side, and providing a chute communicating said feed inlet and outlet sides, inlet lid coupling means proximal to said inlet opening for coupling said inlet lid adjacent said inlet opening, and outlet lid coupling means proximal to said outlet opening for coupling said outlet lid adjacent said outlet opening, said inlet lid and said outlet lid having substantial similarity sufficient to allow operably interchanging said lids by substituting said inlet lid for said outlet lid on outlet lid coupling means, and by substituting said outlet lid for said inlet lid on the inlet lid coupling means.

10. A combination pet feeder and pet waterer assembly for feeding and watering a pet over an extended period of time, said assembly comprising:

a pet feeder including a body, an inlet lid, and an outlet lid, said body including marginal wall structure defining a chamber within said body communicating a feed inlet opening and a feed outlet opening, a divider wall separating said chamber into a feed inlet side and a feed outlet side, and providing a chute communicating said feed inlet and outlet sides, inlet lid coupling means proximal to said inlet opening for coupling said inlet lid adjacent said inlet opening, and outlet lid coupling means proximal to said outlet opening for coupling said outlet lid adjacent said outlet opening, said inlet lid and said outlet lid having substantial similarity sufficient to allow operably interchanging said lids by substituting said inlet lid for said outlet lid on outlet lid coupling means, and by substituting said outlet lid for said inlet lid on the inlet lid coupling means;

means for containing an amount of water, for shielding said water from contamination, and for disbursing said water to a pet in sub-amounts over time; and said containing means including means for coupling said pet feeder adjacent said containing means.

11. The apparatus as set forth in claim 10, said containing means including a drinking trough in communication with a water reservoir, and a pet feeder receiving cavity.

* * * * *